United States Patent
Schwary

[15] 3,650,352
[45] Mar. 21, 1972

[54] REMOTELY OPERATED OIL DRAIN VALVE FOR MOTOR VEHICLES

[72] Inventor: Richard L. Schwary, 2105 N. W. Couch Street, Camas, Wash. 98607

[22] Filed: Nov. 14, 1969

[21] Appl. No.: 876,753

[52] U.S. Cl..................................184/1.5, 251/144, 251/294
[51] Int. Cl.........................................................F01m 11/04
[58] Field of Search..................184/1.5; 251/144, 294, 107; 70/207, 232, 177, 179, DIG. 57; 292/1; 339/75 P, 82; 200/42, 44, 61.42; 74/503

[56] References Cited

UNITED STATES PATENTS

| | | | |
|---|---|---|---|
| 1,626,089 | 4/1927 | Jakosky | 251/294 X |
| 1,938,505 | 12/1933 | Trice et al. | 251/144 |
| 1,949,523 | 3/1934 | Wilson | 251/294 X |
| 1,992,371 | 2/1935 | Hammond et al. | 251/294 X |
| 2,041,002 | 5/1936 | Kreuzer et al. | 251/107 X |
| 2,187,247 | 1/1940 | Nichols | 251/144 |
| 3,310,133 | 3/1967 | Eaker | 184/1.5 |

FOREIGN PATENTS OR APPLICATIONS

| | | | |
|---|---|---|---|
| 715,611 | 1/1942 | Germany | 339/75 P |
| 53,518 | 11/1942 | Netherlands | 251/107 |

*Primary Examiner*—Manuel A. Antonakas
*Attorney*—Robert E. Howard

[57] ABSTRACT

A remotely operated oil drain valve for internal combustion engine crankcases having a valve attached to the bottom of the crankcase, a cable for operating the valve extending to a location remote from the valve and at an easily accessible location for manual operation thereof, and a member for receiving and holding the remote end of the cable in the easily accessible location, which said member operates to keep the valve closed in one position thereof and operates to keep the valve open in the other position thereof.

1 Claims, 4 Drawing Figures

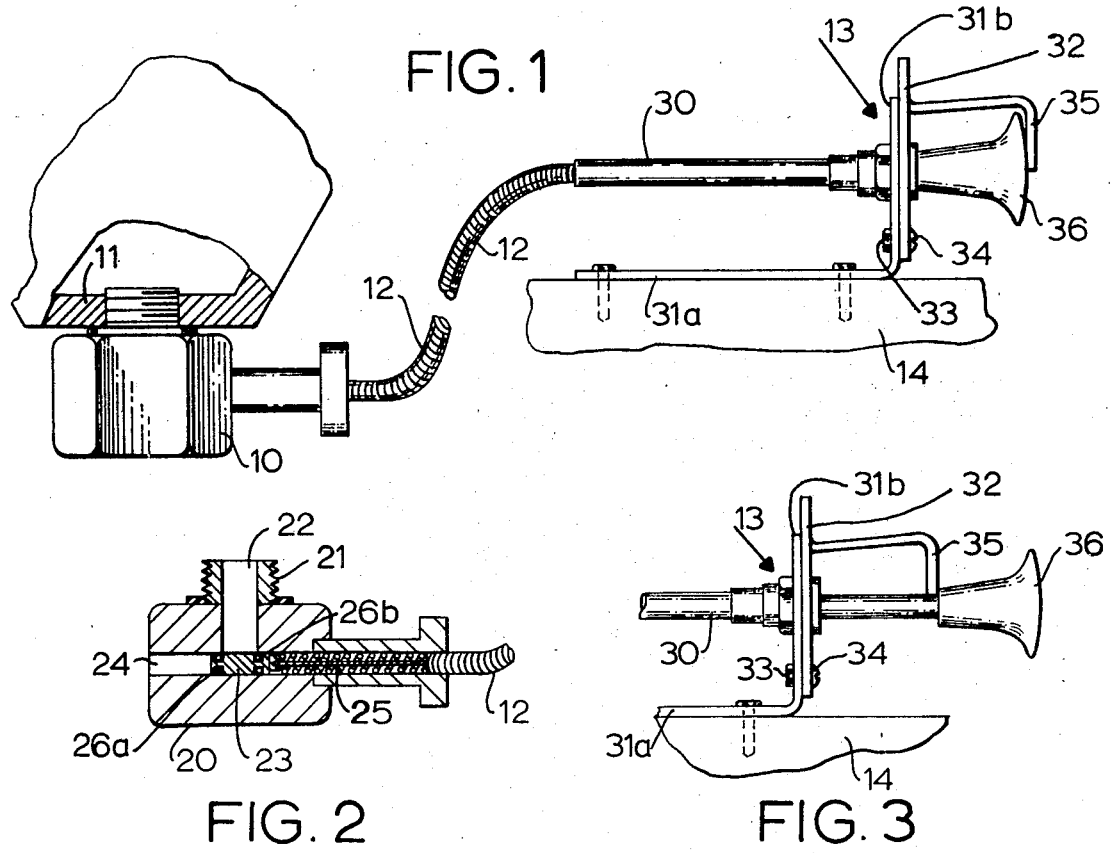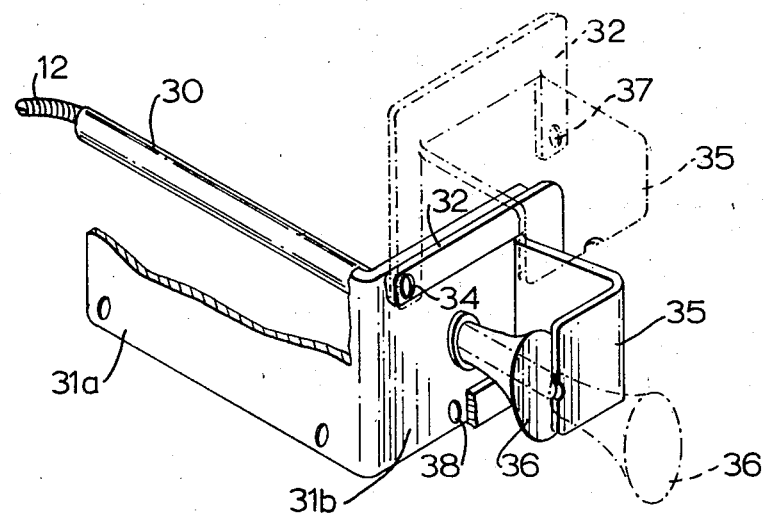
INVENTOR.
RICHARD L. SCHWARY
BY
ATTORNEY

REMOTELY OPERATED OIL DRAIN VALVE FOR MOTOR VEHICLES

BRIEF DESCRIPTION OF THE PRIOR ART

There have been many attempts to construct an oil drain device for internal combustion engines whereby the oil in the crankcase thereof may be expeditiously drained therefrom. Even though such attempts date back almost to the inception of the internal combustion engine for automotive vehicles, such devices have met with spectacular lack of success as witnessed by the fact that even today one must drain motor oil from crankcases by removing a plug from the bottom of the crankcase. Such an expedient requires that the vehicle either be hoisted so that workmen may gain access thereto, or that the automobile be driven over a pit into which the workman descends to gain access to said plug. Since the ordinary automobile owner usually has no such hoists or pits accessible to him, he is required to take his automobile to commercial service centers to have this relatively simple operation performed.

As mentioned, attempts to solve this problem date back many years. Such attempts involved a valve placed at the bottom of engine crankcases, and means for operating such valves from a remote location. Illustrative of such attempts are described in U.S. Pat. Nos. 1,856,826, 1,992,371, and 2,095,696.

The principal difficulty suffered by all such attempts of the prior art is the lack of provision of a relatively simple, inexpensive, and foolproof means of ensuring that the valve is not accidentally opened during operation of the internal combustion engine, since such an eventuality would obviously ruin the engine due to lack of lubrication.

It is the object of this invention therefore to provide a simple, manually operable, remotely controllable device whereby the oil may be drained from the crankcase of an internal combustion engine in an automobile, which said device may be securely locked in a closed position to prevent undesired opening thereof, and yet easily positioned into an open position when desired to effect drainage of oil from the crankcase.

BRIEF DESCRIPTION OF THE PRESENT INVENTION

The present invention comprises a remotely operable oil drain valve having a valve member located at the bottom of the crankcase of an internal combustion engine of an automobile, a cable attached at one end thereof to said valve and extending a location removed from said valve, which said location is in an easily accessible place for manual operation thereof, said end of said cable in said removed location being positioned within a housing attached to a stationary member of the automobile. The housing is constructed so as to permit easy locking of the remote end of said cable in a position whereby the valve is held closed. The housing also permits the remote end of said cable to be positioned so as to open the valve and hold the valve in said open position so the oil in the crankcase may be drained therefrom.

DETAILED DESCRIPTION OF THE PREFERRED EMBODIMENTS

The preferred embodiments of the present invention are illustrated in the drawings, in which:

FIG. 1 is a side view of the crankcase, valve, flexible extension member and receiving housing with lock member of the present invention;

FIG. 2 is a sectional view of the valve member of the present invention;

FIG. 3 is a side view of the receiving housing with lock member; and

FIG. 4 is a perspective view of the latch of the invention located in open and closed position to permit opening and closing of said valve.

Referring now to FIG. 1, the valve 10 of the present invention is shown threadably attached to crankcase bottom 11 of an internal combustion engine. Flexible cable 12 is shown attached to valve 10 at one end thereof, and at a remote end thereof attached to receiving housing 13. Receiving housing 13 is suitably attached to a stationary member 14 of the automobile, such as a frame member, firewall, fender (inside face), etc.

Referring now to FIG. 2, a detail sectional view of a suitable valve member is shown. Valve 11 is comprised of a suitable housing 20 having a threaded portion 21 for connection with the crankcase bottom 11 in place of a conventional plug. If desired, the valve of the present invention can be manufactured with a standard threaded portion 21, and standard bushings could be employed to fit a particular sized plug opening on an automobile crankcase. Valve 10 has a first passageway 22 therein which communicates with the crankcase of the internal combustion engine. Oil is prevented from exiting from passageway 22 by valve piston 23 located in second passageway 24. Valve piston 23 is urged into the position shown, i.e., in a position closing off first passageway 22 from communication with second passageway 24 by spring member 25. Seepage of oil around valve piston 23 is minimized or prevented by seal rings 26a and 26b. Flexible cable 12 is connected to valve piston 23 by any suitable means.

The end of flexible cable 12 located remote from valve 11 is received and held in housing 13. Housing 13 is shown in detail in the views shown in FIGS. 3 and 4.

Referring to FIG. 3, housing 13 is comprised of an inflexible lead-in conduit 30 attached to housing frame 31a and b. Housing frame 31a and b is an L-shaped member, one leg 31a thereof being connected to the automobile body at some suitable location 14. The other leg 31b of the frame carries inflexible conduit 30 which guides flexible cable 12 therethrough. Attached to frame member 31a and b is a latch 32. Latch 32 is connected to frame 31a–b in a manner so as to be movable about a pivot point. Latch 32 may be fastened to frame 31a–b at the pivot point by any suitable means which permits motion thereabout, such as a rivet or nut and bolt combination 33 and 34. Latch 32 is illustrated as being a U-shaped member having an L-shaped catch 35 extending from the base leg thereof. However, latch 32 may have only one leg or two legs (L-shaped) if desired. The outer reach of catch 35 is adapted to at least partially cover and hold knob 36, the remote terminus of flexible cable 12, in a closed position so that it may not move outwardly of latch leg 31b. In this position, valve piston 23 is in a forward position within passageway 24 so that oil may not flow from the crankcase therethrough.

FIG. 4 illustrates (in phantom view) latch 32 rotated about the pivot point into a position to permit knob 36 to be pulled past outer reach of catch 35, thereby pulling valve piston 23 past passageway 22 via cable 12, whereby oil from crankcase 11 may flow downwardly from passageway 22 into passageway 24, and be drained away into a suitable receptacle.

FIG. 4 also illustrates latch 32 rotated back into its initial position, but now it acts as a stop to prevent knob 36 (in phantom view) from being pulled back into its position of rest by virtue of the action of spring member 25 acting on valve piston 23.

In operation, when it is desired to drain the oil from the crankcase of an internal combustion engine fitted with the present invention, it is only necessary to rotate latch 32 into the position illustrated in phantom view in FIG. 4, pull outwardly on knob 36 to thereby open valve 10, and rotate latch 32 back into its initial position. Knob 36 may then be released, coming to rest on the outer surface of catch 35 with valve 10 remaining in an open position. After all the oil has drained from the crankcase, latch 32 is again rotated into the position illustrated in phantom view in FIG. 4, and knob 36 permitted to retract into its position of rest in contact with frame 31 by virtue of the action of spring 25 acting against valve piston 23. Latch 32 is then rotated back into a closed position as shown in FIGS. 3 and 4.

While ordinarily the action at the pivot point is resistant to motion of latch 32 during operation of the motor vehicle, if it is desired to further provide a safety measure against the accidental dislocation of latch 32 into the open position during such operation of the engine, means (not shown) may be provided for locking latch 32 in the closed position. Such locking means may simply take the form of a wingnut and bolt inserted through holes such as 37 and 38 located in the latch 32 and frame 31b respectively, said holes 37 and 38 being coaxially aligned for insertion of said bolt therethrough when latch 32 is in a closed position. Other readily apparent possibilities are male and female impressions located in latch 32 and frame 31 which mate when the latch 32 is in a closed position, yet which are shallow enough to permit latch 32 to be rotated into an open position by the exercise of a relatively small amount of force.

From the foregoing description it is seen that a remotely operable oil drain valve for the crankcase of internal combustion engines has been disclosed which permits easy access to effect such drainage, yet is sufficiently safe that there is little or no likelihood of accidental opening thereof during engine operation.

I claim:

1. An apparatus for remotely effecting the drainage of oil from the crankcase of an internal combustion engine comprising a valve, said valve having a housing with a threaded portion suitable for connection to the oil drain of a crankcase bottom, said valve housing having a first passageway therein for communicating with said crankcase, a second passageway therein perpendicular to said first passageway, a piston located in said second passageway, said piston being urged into a position closing said first passageway by a spring means, a long flexible cable having one end connected to one end of said piston, the second end of said cable extending through an inflexible conduit attached to one side of an L-shaped housing located at a position remote from said valve, said second end of said cable being connected to a knob member located on the other side of said housing, and a U-shaped latch member pivotable about a point located on one upright arm of the latch, said latch being fastened at said pivot point to one leg of said L-shaped housing by suitable fastening means whereby said latch can be rotated about said pivot point, an L-shaped catch extending from the base of said U-shaped latch, the outer reach of said catch being adapted to at least partially cover and hold said knob when in one position, but adapted to permit outward movement of the knob when said catch is pivoted along with the latch member about its pivot point, said catch holding said knob in an open position when the knob is moved outwardly to a position just past the outer reach of said catch by abutting against the back end of the knob when said catch is rotated back to its initial position.

* * * * *